United States Patent
Peters et al.

(10) Patent No.: US 6,672,111 B2
(45) Date of Patent: Jan. 6, 2004

(54) METHOD AND APPARATUS FOR ADDING METALS TO FUSED SILICA

(75) Inventors: William P. Peters, Addison, NY (US); Merrill F. Sproul, Big Flats, NY (US); Daniel R. Sempolinski, Painted Post, NY (US); Michael H. Wasilewski, Corning, NY (US)

(73) Assignee: Corning Incorporated, Corning, NY (US)

( * ) Notice: Subject to any disclaimer, the term of this patent is extended or adjusted under 35 U.S.C. 154(b) by 51 days.

(21) Appl. No.: 10/034,540

(22) Filed: Dec. 21, 2001

(65) Prior Publication Data

US 2003/0205057 A1 Nov. 6, 2003

(51) Int. Cl.$^7$ ............................................... C03B 19/14
(52) U.S. Cl. .............................. 65/416; 65/414; 65/421; 65/17.4; 65/137
(58) Field of Search ......................... 65/17.4, 414, 416, 65/421, 137

(56) References Cited

U.S. PATENT DOCUMENTS

| | | | |
|---|---|---|---|
| 5,141,549 A | * 8/1992 | Tumminelli | ................. 65/386 |
| 5,330,941 A | 7/1994 | Yaba et al. | |
| 5,395,413 A | 3/1995 | Sempolinski | ................. 65/414 |
| 5,951,730 A | * 9/1999 | Schermerhorn | ............. 65/17.3 |
| 6,205,818 B1 | 3/2001 | Seward, II | .................... 65/33.2 |
| 6,235,669 B1 | 5/2001 | Antczak et al. | |
| 6,289,698 B1 | 9/2001 | Antos et al. | |
| 6,410,192 B1 | 6/2002 | Priestley et al. | |
| 6,474,106 B1 | * 11/2002 | Crossland et al. | ............. 65/377 |
| 6,487,879 B1 | * 12/2002 | Blackwell et al. | ............ 65/414 |

FOREIGN PATENT DOCUMENTS

| | | | |
|---|---|---|---|
| DE | 19918001 | 10/1999 | |
| EP | 0 921 104 A1 | 6/1999 | ............. C03C/3/06 |
| EP | 0 401 845 B2 | 4/2001 | ............ G02B/1/00 |
| JP | 03-083833 | 4/1991 | |
| JP | 08040737 | 2/1996 | |
| JP | 10-53432 | 2/1998 | ............. C03C/3/06 |
| JP | 10-053432 | 2/1998 | |
| JP | 2000169163 | 6/2000 | |
| WO | WO 90/10596 | 9/1990 | |
| WO | WO 98/39496 | 9/1998 | ........... C23C/16/40 |

OTHER PUBLICATIONS

The Condensed Chemcial Dictionary, Sixth Edition, Reinhold Pub. Corp., New York, 1961, pp. 49–50.*
G. H. Sigel, Jr., Ultraviolet Spectra of Silicate Glasses: A Review of Some Experimental Evidence, Journal of Non–Crystalline Solids, 13 (1973/74) 372–398.
Charlene M. Smith et al., Transient absorption in Excimer–Exposed Silica, Applied Optics, vol. 39, No. 31, Nov. 1, 2000, pp. 5778–5784.
K. Saito et al., Effects of Aluminum Impurity On The Structural Relaxation In Silica Glass, , Journal of Non–Crystalline Solids 270 (2000) 60–65.

* cited by examiner

Primary Examiner—James Derrington
(74) Attorney, Agent, or Firm—Timothy M. Schaeberle; James V. Suggs

(57) ABSTRACT

Methods and apparatus for adding metals such as aluminum to fused silica glass articles are disclosed. The methods and apparatus allow for controlled, low level addition of metals into fused silica glass articles. The fused silica glass articles containing added aluminum exhibit improved internal transmission and decreased absorption change when irradiated with a laser.

8 Claims, 3 Drawing Sheets

METHOD AND APPARATUS FOR ADDING METALS TO FUSED SILICA

FIELD OF THE INVENTION

This invention relates to fused silica. More particularly, the invention relates to methods and apparatus used for adding metals such as aluminum to fused silica glass articles.

BACKGROUND OF THE INVENTION

As practiced commercially, fused silica optical members such as lenses, prisms, filters, photomasks, reflectors, etalon plates and windows are typically manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, including manufacturing steps that may include, but are not limited to, cutting, polishing, and/or coating pieces of glass from a blank. These optical members are used in various apparatus employed in environments where they are exposed to high-power ultraviolet light having a wavelength of about 360 nm or less, for example, an excimer laser beam or some other high-power ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

In overview, boules are manufactured by reacting silicon-containing gas molecules in a flame to form silica soot particles. The soot particles are deposited on the hot surface of a rotating or oscillating body where they consolidate to the glassy solid state. In the art, glass making procedures of this type are known as vapor phase hydrolysis/oxidation processes, or simply as flame deposition processes. The term "boule" is used herein with the understanding that the term "boule" includes any silica-containing body formed by a flame deposition process.

Boules typically having diameters on the order of five feet (1.5 meters) and thicknesses on the order of 5–10 inches (13–25 cm) and larger can be routinely produced in large production furnaces. Multiple blanks are cut from such boules and used to make the various optical members referred to above. The principal optical axis of a lens element made from such a blank will also generally be parallel to the boule's axis of rotation in the furnace. For ease of reference, this direction will be referred to as the "axis 1" or "use axis". Measurements made in a direction perpendicular to the axis 1 or use axis will be referred to as "off-axis" measurements.

As the energy and pulse rate of lasers increase, the optical members which are used in conjunction with such lasers are exposed to increased levels of laser radiation. Fused silica members have become widely used as the manufacturing material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength excimer lasers operating in the UV and deep UV (DUV) wavelength ranges, which includes lasers operating at about 193 nm and 248 nm wavelengths. Excimer laser systems are popular in microlithography applications, and the shortened wavelengths allow for increased line densities in the manufacturing of integrated circuits and microchips, which enables the manufacture of circuits having decreased feature sizes. A direct physical consequence of shorter wavelengths (higher frequencies) is higher photon energies in the beam due to the fact that each individual photon is of higher energy. In such excimer laser systems, fused silica optics are exposed to high energy photon irradiation levels for prolonged periods of time resulting in the degradation of the optical properties of the optical members.

It is known that laser-induced degradation adversely affects the performance of fused silica optical members by decreasing light transmission levels, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, are susceptible to laser damage to various degrees.

One of the known methods for reducing absorption levels in the glass is to reduce total metal impurity levels of metals such as sodium, aluminum, and iron. For example, one known way of reducing metals impurities in the glass involves treating the refractory materials used in the fused silica production furnace with a halogen gas. Further details on this method are described in U.S. Pat. No. 6,174,509. Another known method of improving the transmission and durability of fused silica optical members is disclosed in U.S. Pat. No. 6,174,830, which discloses annealing silica glass members for 10 or more hours at 1000° C. so that the hydrogen content of the member is $5 \times 10^{18}$ molecules/cm$^3$ or less. While the method in U.S. Pat. No. 6,174,830 is advantageous in that it produces optical members having excellent properties, the annealing process takes a considerable amount of time and expense to produce such members.

Fused silica members can also exhibit transient absorption. As described in the article "Transient absorption in excimer-exposed silica," by Charlene Smith, Nicholas Borrelli and Roger Araujo, Applied Optics, Vol. 39, No. 31, 5778–5784 (Nov. 1, 2000), the contents of which are incorporated herein by reference, transient absorption can take two forms. In one form, the transmittance of glass in the UV region recovers somewhat when the irradiation source is removed and redarkens quickly when reexposed to light. In the second form, absorption occurs upon the initial irradiation of the glass, and this absorption decreases with constant illumination of the optical member. This type of transient absorption will be referred to herein as an "absorption spike." This absorption spike is problematic because optical elements contained in optical equipment such as stepper systems must be exposed to a sufficient number of pulses to work through the absorption spike and reduce to the absorption value to avoid the undesirable effects of absorption changes in an optical member when the optical member is placed in service. This exposure process requires optical equipment manufacturers to devote time and resources to work through the absorption spike to reduce absorption to an acceptable level.

The presence or the absence of the absorption spike has been traced to the level of molecular hydrogen dissolved in the glass. Typically, optical members containing high amounts of hydrogen, for example, a concentration of $10^{19}$ molecules/cm³, do not have a measurable absorption spike. Accordingly, manufacturing of optical members with high amounts of molecular hydrogen is one way of reducing this absorption spike. Hydrogen can be introduced during the boule formation process or after formation of the boule.

Commonly assigned, copending United States Patent application, entitled "Fused Silica Containing Aluminum," naming Dan Sempolinski as inventor, discloses that inclusion of low levels of aluminum (>50 ppb) in fused silica glass articles improves transmission, and the absorption spike is significantly reduced when compared to fused silica glass articles that do not contain additional aluminum. Low levels of aluminum, for example, as low as about 50 parts per billion and as high as about 900 parts per billion have been observed to improve the aforementioned properties in fused silica optical articles. Normally, impurity levels of aluminum in fused silica glass articles presently manufactured by the assignee of the present invention are typically below 20 parts per billion. In the past, the assignee of the present invention has manufactured fused silica articles that contain around 50 parts per billion of aluminum. However, these fused silica articles also contained high levels of other metal impurities such as sodium and iron (e.g., sodium levels as high as 100 ppb), with the internal transmission of fused silica articles at 193 nm being no greater than about 99.4%/cm.

In the course of experimentation with varying the metal levels in fused silica glass to optimize the properties of fused silica articles, applicants discovered that introduction of metals into fused silica articles at the parts per million and parts per billion levels is challenging and difficult to achieve. Accordingly, a need exists to provide methods and apparatus capable of introducing metals in fused silica glass in low levels, for example, at the parts per million and parts per billion level.

It would be desirable to provide methods and apparatus for manufacturing fused silica glass articles that exhibit improved transmission and a decreased absorption spike. It would be advantageous if the production of such fused silica glass articles could be provided without having to resort to expensive and time consuming treatments such as annealing or prolonged irradiation after formation of the optical members. It would be advantageous to provide a method of adding metals to fused silica glass articles that would allow for the controlled introduction of metals at the parts per million and parts per billion levels.

SUMMARY OF THE INVENTION

The invention relates to methods and apparatus for producing fused silica glass articles. As used herein, the term "fused silica glass article" includes boules or bulk pieces of fused silica produced in a furnace, blanks cut from boules, and fused silica optical members manufactured from blanks of fused silica. The production of fused silica optical members may involve finishing steps including, but not limited to cutting, grinding, polishing and/or coating the piece of fused silica glass. Methods and apparatus are provided that are capable of producing fused silica glass articles having high internal transmission and high resistance to optical damage by ultraviolet radiation in the ultraviolet wavelength range.

According to one embodiment of the invention, a method of adding metal to fused silica glass articles is provided. The method includes the steps of producing a silicon-containing gas stream in vapor form capable of being converted through thermal decomposition with oxidation or flame hydrolysis to silica and flowing a second gas stream over a powdered, organometallic precursor and sublimating the precursor to enrich the second gas with the organometallic precursor and to provide a dopant-containing gas stream. As used herein, the terms "dopant," "doped" and doping refer to the addition or incorporation of metals or other materials to fused silica. According to one embodiment of the invention, such doping includes the addition of metals to the fused silica during the flame deposition process. In one embodiment, the method further includes the steps of mixing the silicon-containing gas stream and the second gas stream, flowing the mixed gas streams into the flame of a combustion burner to form amorphous particles of doped fused silica, depositing the amorphous particles onto a support and consolidating the deposit of amorphous particles into a transparent glass body.

In another embodiment of the invention, the second gas stream is heated to a first temperature, the precursor is heated to a second temperature to sublimate the precursor, and the temperature of the saturated, dopant-containing gas is heated and maintained at a third temperature. According to another embodiment, the precursor includes an organometallic chelate. In another embodiment, the precursor includes a nonhydrolyzable organometallic chelate. In another embodiment, the dopant level in the fused silica member is controlled below 100 parts per million, preferably below 900 parts per billion, and typically in the range of 50 ppb and 900 ppb. According to another embodiment of the invention, the organometallic chelate includes aluminum. In still another embodiment, the organometallic chelate includes aluminum acetylacetonate. For this embodiment, the first temperature is between about 100° C. to 160° C., the second temperature is between 0° C. and 10° C. below the first temperature, and the third temperature is greater than 175° C.

In still another embodiment, the consolidated glass body is cooled from a temperature greater than 1800° C. to a temperature less than 1200° C. over a time period greater than four hours. Applicants have found that by adding aluminum to fused silica glass and slowly cooling the fused silica glass results in a glass articles that have high internal transmission, for example greater than 99.5%/cm at 193 nm and a decreased absorption change.

Certain embodiments of the invention relate to a method of manufacturing a fused silica optical member including the step of providing a gas stream containing a silicon-containing compound in vapor form capable of being converted through thermal decomposition with oxidation or flame hydrolysis to silica. This embodiment further includes the steps of adding a metal to the gas stream in a manner such that the amount of the metal in the fused silica optical member can be controlled to a level of at least 50 parts per billion and flowing the gas stream into the flame of a combustion burner to form amorphous particles of doped fused silica. In another embodiment, the step of adding the metal to the gas stream includes sublimating a metal containing precursor, such as, for example an organometallic chelate. In one embodiment, the precursor includes aluminum acetylacetonate.

Still another embodiment of the invention relates to an apparatus for doping metals into a fused silica glass article. According to this embodiment, the apparatus includes a heated precursor chamber for holding a powdered metallic precursor and a heated stream of carrier gas in fluid communication with the precursor chamber, wherein the carrier gas is passed through the precursor chamber to provide a mixture of carrier gas. In this embodiment, the apparatus further includes a delivery line for delivering the mixture of carrier gas and precursor to a gas stream containing a silicon-containing compound in vapor form capable of being converted through thermal decomposition with oxidation or flame hydrolysis to silica. In another embodiment, the precursor chamber includes a screen for containing the precursor and for allowing gas to pass through the precursor chamber. In another embodiment, the apparatus is capable of controlling the amount of metal introduced into the fused silica at a level of 50 parts per billion. In still another embodiment, a plurality of combustion burners in fluid communication with the silicon containing gas stream are provided to provide a flame for combusting the silicon-containing gas and converting the gas to silica particles.

According to the present invention, methods and apparatus are provided that enable the controlled introduction of metallic dopants into fused silica at levels as low as 50 parts per billion. The methods and apparatus of the present invention enable the production of fused silica articles exhibiting lower absorption and increased internal transmission.

Additional advantages of the invention will be set forth in the following detailed description. It is to be understood that both the foregoing general description and the following detailed description are exemplary and are intended to provide further explanation of the invention as claimed.

DETAILED DESCRIPTION

Figure 1:
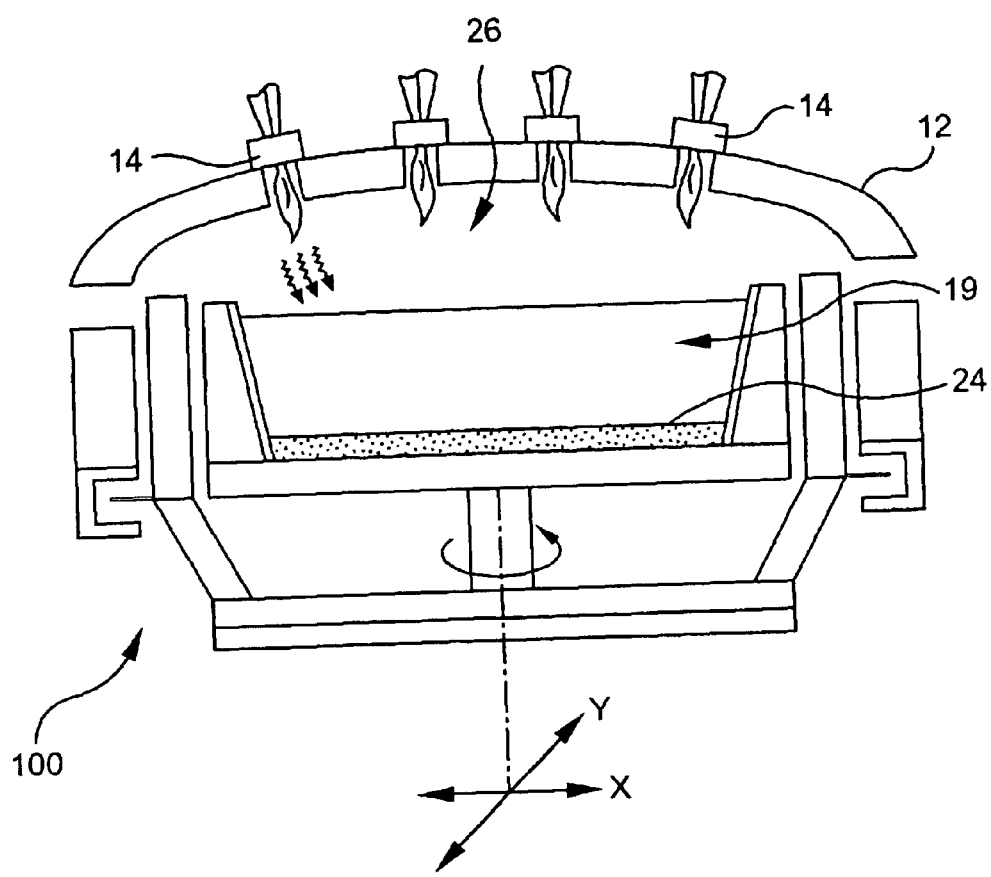
FIG. 1 is a schematic drawing of a furnace used to produce fused silica glass in accordance with one embodiment of the present invention.

According to the present invention, methods and apparatus are provided for the production fused silica glass articles having improved internal transmission and reduced absorption change are provided. Manufacture of fused silica boules typically involves using a process gas, for example, nitrogen, as a carrier gas and if necessary a bypass stream of the nitrogen is introduced to prevent saturation of the vaporous stream. The vaporous reactant is passed through a distribution mechanism to a reaction site where a number of burners are present in close proximity to a furnace crown. The reactant is combined with a fuel/oxygen mixture at the burners and combusted and oxidized at a temperature greater than 1700° C. According to one embodiment, metals such as aluminum are introduced into the reactant stream so that at least 50 parts per billion of metal dopant is contained in the fused silica glass article. The amount of metal added to the glass article will vary with the desired properties of the optical members produced from the boule. However, according to the present invention, the level of dopant contained in a boule can be controlled from the hundreds of parts per million range down to a level of about 10 part per billion (ppb). In some embodiments, the amount of dopant introduced in the fused silica may exceed 100 ppb, and in some embodiments, be as high as 100 ppm. One embodiment of the present invention provides methods and apparatus of controlling the introduction of such low levels of metallic dopants.

According to one embodiment of the invention, low levels of dopants are introduced into fused silica glass articles using a dopant precursor delivery system in combination with a multiple burner furnace. Although the invention is not limited to methods and apparatus utilizing multiple burners, a multiple burner arrangement facilitates dilution of the dopant and distribution of the dopant in the glass boule.

In one embodiment of the invention, a fused silica glass article having resistance to laser damage is formed by:
 a) producing a gas stream containing a silicon-containing compound in vapor form capable of being converted through thermal decomposition with oxidation or flame hydrolysis to silica;
 b) introducing a metal dopant such as aluminum into the gas stream;
 c) passing the gas stream into the flame of a combustion burner to form amorphous particles of metal-doped fused silica;
 d) depositing the amorphous particles onto a support; and
 e) consolidating the deposit of amorphous particles into a transparent glass body.

Useful silicon-containing compounds for forming the glass blank preferably include any halide-free cyclosiloxane compound, for example, polymethylsiloxane such as hexamethyldisiloxane, polymethylcyclosiloxane, and mixtures of these. Examples of particularly useful polymethylcyclosiloxanes include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula —[SiO(CH$_3$)$_2$]$_4$—, is used as the feedstock for the fused silica boule process, or in the vapor deposition processes such as used in making high purity fused silica for optical waveguide applications.

In one particular embodiment of the invention, aluminum is added to fused silica glass articles to improve internal transmission and decrease the absorption change in the glass. A particularly preferred precursor for adding aluminum to fused silica glass articles is aluminum acetylacetonate. Aluminum acetylacetonate and OMCTS are chemically compatible, and they do not react prematurely when gas streams containing both materials are mixed. In addition, the vaporization characteristics of aluminum acetylacetonate are compatible with existing OMCTS vapor delivery systems. For example, aluminum acetylacetonate does not decompose at temperatures required to deliver OMCTS to a burner for conversion to silica soot.

As practiced commercially, boules having diameters on the order of five feet (1.5 meters) and thicknesses on the order of 5–10 inches (13–25 cm) and greater can be produced using furnaces of the type shown in FIG. 1. In brief overview, furnace 100 includes a furnace chamber 26 and a crown 12 which carries a plurality of burners 14 which produce silica soot which is collected on a collection surface 24 to form boule 19, which, as noted above, are typically on the order of five feet in diameter. Further details on the structure and operation of furnaces of this type may be found in commonly assigned U.S. Pat. No. 5,951,730, the entire contents of which are incorporated herein by reference. Particular details on burner configurations for making fused silica boules may be found in commonly-assigned PCT patent publication number WO 00/17115.

Applicants have surprisingly discovered that adding aluminum dopant to fused silica glass in an amount greater than the normal aluminum impurity level present in the fused silica glass greatly improved several properties of such members. Typically, fused silica glass articles made by the assignee of the present invention contain total metals impurities less than 100 ppb. These metal impurities typically include alkalis, alkali earths, iron, zirconium, titanium and copper. In a typical fused silica member, metal impurities such as sodium and iron are less than 10 ppb each, and aluminum impurity levels are less than 20 ppb. Although fused silica glass articles have been produced by the assignee of the present invention containing about 50 parts per billion of aluminum and up to 100 ppb of sodium in the glass, these glass articles also contained high levels of other metal impurities such as sodium and iron, and the internal transmission of these glass articles was less than 99.4%/cm at 193 nm.

According to one embodiment of the present invention, aluminum is intentionally added or doped into the fused silica members in an amount exceeding the normal impurity level. In one embodiment, the amount of aluminum dopant in the member is greater than 50 ppb. In another embodiment, the aluminum dopant present in the member exceeds 100 ppb. In still another embodiment, the amount of aluminum dopant is between 200 ppb and 400 ppb. The unique aluminum delivery apparatus and methods according to certain embodiments of the present allow the precise and controlled delivery of low levels of aluminum or other selected metal dopants while limiting the levels of undesirable metals in the glass articles that negatively impact optical properties. Multiple burner arrangements also aid in controlling the introduction and distribution of low levels of dopants into the fused silica glass.

The ability to provide fused silica articles with higher aluminum content results in manufacturing processes that require less stringent measures for controlling impurity levels in furnaces used to make these glass articles. The manufacturing process is therefore more flexible and robust with respect to the quality of the furnace refractories and the chemical precursors used to produce fused silica articles. Refractory or chemical precursor changes can be made to lower cost and/or improve furnace performance without degradation of optical properties. However, it is preferable to use fused silica manufacturing furnaces having the highest purity refractories available to avoid other undesirable metal contaminants such as iron and sodium. In one preferred embodiment of the invention, the furnace refractories should contain less than 2 ppm of sodium and less than 5 ppm of iron in the refractories to maximize ArF transmission. Refractories containing low levels of impurities can be obtained by utilizing the halogen gas treatment process disclosed in U.S. Pat. No. 6,174,509.

The fused silica optical boules used to make optical members of the present invention can be made using either chlorine-containing or chlorine-free chemical precursors. If such a process is used, it may be necessary to adjust the dopant level to account for dopant loss during chlorine treatment that may occur to due reaction of the chlorine and metal dopants in the glass. Therefore, it is advantageous to using chlorine-free precursors in that the resulting low-chlorine glasses can retain higher metal concentrations without loss of UV transmission.

In another embodiment of the invention, applicants have discovered that especially good ArF transmission and damage resistant fused silica glass can be made by adding aluminum to the fused silica glass during the boule production process and slowly cooling the boule after manufacture. During the fused silica boule manufacturing process, the temperature of the glass boule is usually heated to temperatures exceeding 1800° C. According to conventional fused silica boule manufacturing processes, boules are cooled from a temperature of about 1850° C. to 1100° in less than 30 minutes. However, according to one embodiment of the present invention, fused silica boules containing additional aluminum added during the boule manufacture process are cooled from about 1850° C. to about 1100° C. in about four hours or more. Applicants have discovered that the combination of the addition of aluminum to the fused silica glass at a level of at least 50 parts per billion combined with a slow cooling of the glass boule after formation results in fused silica glass articles having extremely high internal transmission at 193 nm and reduced absorption change as discussed further below.

The introduction of dopants and control of dopant concentration in the parts per million and parts per billion range necessitated the design of the methods and apparatus of the present invention. The raw materials and the system required to deliver dopants should be designed to prevent the introduction of any other impurities, particularly metal impurities.

Figure 2:
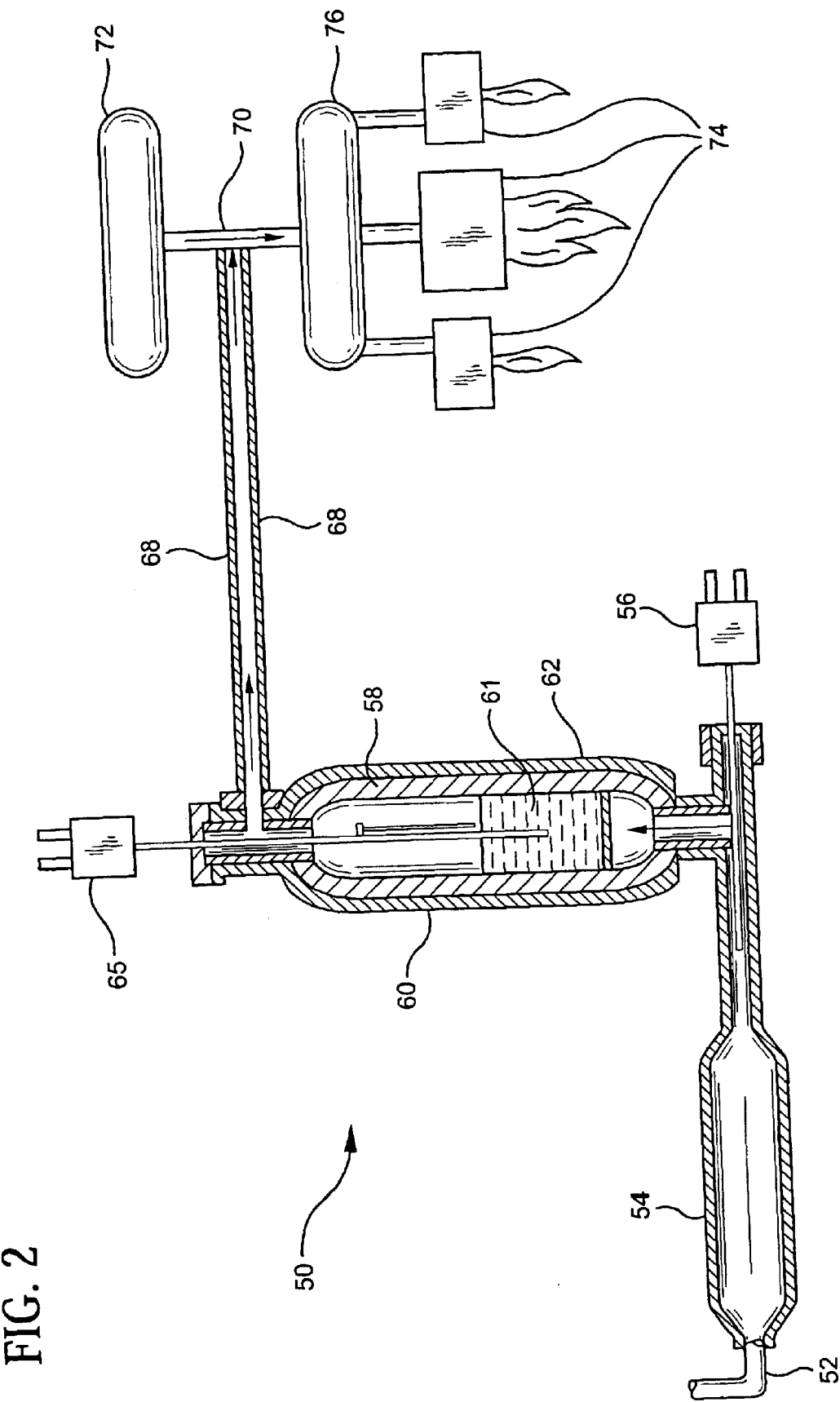
FIG. 2 is a schematic drawing of a dopant delivery system for adding dopants to fused silica glass according to one embodiment of the invention.

Referring now to FIG. 2, a dopant delivery system is shown according to one embodiment of the present invention. The dopant delivery system 50 includes a carrier gas supply line 52 connected to a carrier gas source (not shown). A suitable carrier gas is nitrogen, but other carrier gases can be used in accordance with the present invention. According to one embodiment of the present invention, the carrier gas is heated by a heating element 54. A thermocouple 56 or other suitable device for monitoring the temperature of the carrier gas is placed in contact with the carrier gas.

The carrier gas supply line 52 is in fluid communication with a precursor chamber 58. The precursor chamber includes a second heating element 60 for heating the precursor material 61 as carrier gas flows through the precursor chamber. In one embodiment of the invention, the precursor is a powdered metallic precursor. A suitable precursor is a powdered metallorganic precursor. In one embodiment of the invention, aluminum is doped into fused silica optical members. A suitable precursor material for doping aluminum into fused silica members is an aluminum chelate. It is desirable to use nonhydrolyzable chelates because hydrolyzable chelates typically transform into hydrates which precipitate before thorough mixing with the silicon-containing vapor and can not be pyrolyzed in a flame of combustion burner to provide aluminum at the target dopant level. Examples of nonhydrolyzable aluminum chelates include aluminum acetylacetonate and aluminum isovalerylacetonate.

The precursor chamber 58 may include a meshed material or a screen 62 for supporting the precursor material and to allow the carrier gas to flow through the powdered material. A thermocouple or other suitable temperature monitoring element 65 monitors the temperature of the precursor chamber. A delivery line 66 is connected to the precursor chamber 58, and a third heating element 68 is provided to control the temperature of the carrier gas containing the precursor.

The delivery line 66 is in fluid communication with a fume stream 70, which delivers a silicon-containing compound from a vaporizer 72 in vapor form capable of being converted through thermal decomposition with oxidation or flame hydrolysis to silica. According to one embodiment, the silicon-containing compound includes vaporized octamethylcyclotetrasiloxane (OMCTS). The mixed gas stream of the silicon-containing gas mixed with the metal-containing gas stream is introduced into the flame of combustion burners 74 of a furnace of the type shown in FIG. 1 after passing through flow distribution unit 76. The flow distribution unit 76 distributes the silicon-containing gas mixed with the metal-containing gas to the multiple combustion burners 74. The gas stream is converted into metal-doped fused silica particles that are deposited onto a support and consolidated into a doped fused silica boule according to techniques known in the art.

Figure 3:
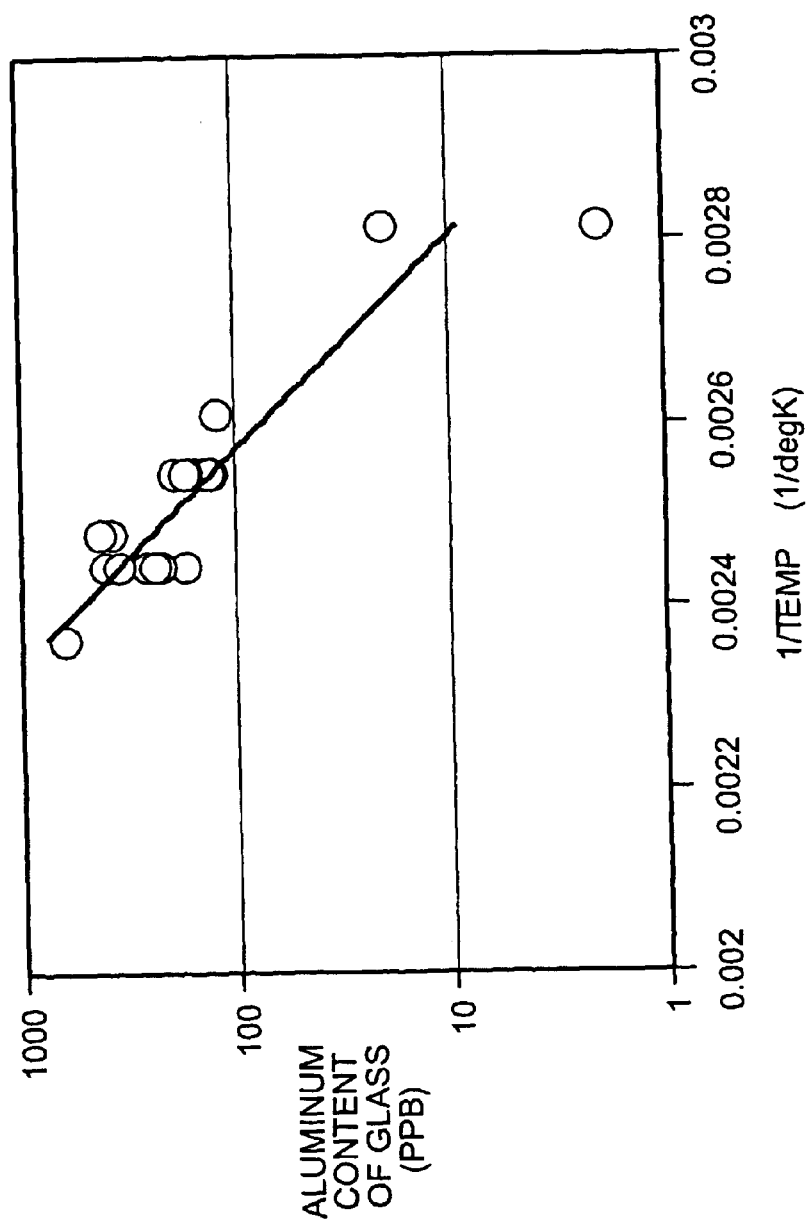
FIG. 3 is a graph of aluminum level in a fused silica glass article versus temperature according to one embodiment of the present invention.

In one embodiment of the present invention, the apparatus of FIG. 1 can be used to manufacture aluminum doped fused silica according to the following procedure. Powdered aluminum acetylacetonate was placed in the precursor chamber 58, which included a fine meshed screen 62. Nitrogen carrier gas was passed through the precursor chamber. The precursor chamber was heated to a temperature of between about 1100° C. and 160° C. The nitrogen carrier gas was heated to a temperature that was less than about 10° C. than the precursor chamber. After passing through the precursor chamber, the delivery line 66 containing aluminum vapor and nitrogen is heated to a temperature greater than 175° C. Heating the precursor chamber and the delivery line causes the aluminum acetylacetonate precursor to sublime. By carefully controlling the temperature of the carrier gas, the delivery line and the precursor chamber allows the precise control of the amount of precursor in the fused silica member. As shown in FIG. 3, which is a graph of aluminum content in parts per billion versus 1/temperature, the aluminum content can be controlled from above 100 parts per million down to 10 parts per billion. The dopant level can be controlled by changing the flow rate of the silicon-containing gas, the number of burners or by varying the temperature of the precursor chamber. Control over the amount of dopant in the fused silica will enable the production of fused silica with precise dopant levels and control over optical properties.

It will be apparent to those skilled in the art that various modifications and variations can be made to the present invention without departing from the spirit or scope of the invention. Thus, it is intended that the present invention covers modifications and variations of this invention provided they come within the scope of the appended claims and their equivalents.

What is claimed is:

1. A method of fabricating a bulk aluminum-doped fused silica glass article, the method comprising the steps of:

providing a silicon-containing gas stream capable of being converted through thermal decomposition with oxidation or flame hydrolysis to silica;

flowing a second gas stream over a powdered, organometallic aluminum-containing precursor and sublimating the precursor to saturate the gas with the organometallic aluminum-containing precursor and to provide an aluminum dopant-containing gas stream;

mixing the silicon-containing gas stream and the aluminum dopant-containing gas stream;

flowing the mixed gas streams into the flame of a combustion burner to form amorphous particles of aluminum doped fused silica;

depositing the amorphous particles onto a support;

consolidating the deposit of amorphous particles into a transparent glass body containing between 100 parts per billion and 100 parts per million of aluminum and having an internal transmittance of greater than 99.5%/cm at a wavelength of 193 nm.

2. The method of claim 1, further comprising the step of heating the second gas stream to a first temperature, heating the precursor to a second temperature to sublimate the precursor, and maintaining the temperature of the saturated, aluminum dopant-containing gas stream at a third temperature.

3. The method of claim 1, wherein the precursor is an organometallic chelate.

4. The method of claim 3, wherein the precursor is a nonhydrolyzable organometallic chelate.

5. The method of claim 3, wherein the organometallic chelate includes aluminum acetylacetonate.

6. The method of claim 1, wherein aluminum is present in the fused silica optical member in a concentration between 100 ppb and 900 ppb.

7. The method of claim 5, wherein the precursor is aluminum acetylacetonate, and wherein the first temperature is between 100° C. to 160° C., the second temperature is between 0° C. and 10° C. below the first temperature, and the third temperature is greater than 175° C.

8. The method of claim 1, further comprising the step of cooling the consolidated glass body from a temperature of greater than 1800° C. to a temperature less than 1200° C. over a time period greater than four hours.

* * * * *